United States Patent
Noh et al.

(10) Patent No.: US 9,920,158 B2
(45) Date of Patent: Mar. 20, 2018

(54) COATING COMPOSITION HAVING SMOOTH TEXTURE FOR ONE-COAT-ONE BAKE COATING

(71) Applicants: HYUNDAI MOTOR COMPANY, Seoul (KR); KIA MOTORS CORPORATION, Seoul (KR); NOROO BEE CHEMICAL CO., LTD., Chungcheongnam-do (KR)

(72) Inventors: Eun Ju Noh, Gyeongsangnam-do (KR); Woo Chul Jung, Incheon (KR); Min Hee Lee, Seoul (KR); Yong Chul Lee, Chungcheongnam-do (KR); Dea Geun Oh, Chungcheongnam-do (KR); Young Seok Kim, Chungcheongnam-do (KR); Ji Yeon Jung, Gyeonggi-do (KR); Jae Beom Ahn, Gyeonggi-do (KR)

(73) Assignees: HYUNDAI MOTOR COMPANY, Seoul (KR); KIA MOTORS CORPORATION, Seoul (KR); NOROO BEE CHEMICAL CO., LTD., Cheonan-si, Chungcheongnam-do (KR)

( * ) Notice: Subject to any disclaimer, the term of this patent is extended or adjusted under 35 U.S.C. 154(b) by 154 days.

(21) Appl. No.: 14/933,569

(22) Filed: Nov. 5, 2015

(65) Prior Publication Data

US 2016/0168417 A1    Jun. 16, 2016

(30) Foreign Application Priority Data

Dec. 12, 2014    (KR) ........................ 10-2014-0179397

(51) Int. Cl.
| | | |
|---|---|---|
| C08G 18/40 | (2006.01) | |
| C08G 18/42 | (2006.01) | |
| C08G 18/44 | (2006.01) | |
| C08G 18/62 | (2006.01) | |
| C08G 18/73 | (2006.01) | |
| C08G 18/75 | (2006.01) | |
| C08G 18/76 | (2006.01) | |
| C09D 175/04 | (2006.01) | |

(52) U.S. Cl.
CPC ..... *C08G 18/6216* (2013.01); *C08G 18/4063* (2013.01); *C08G 18/42* (2013.01); *C08G 18/44* (2013.01); *C08G 18/73* (2013.01); *C08G 18/755* (2013.01); *C08G 18/758* (2013.01); *C08G 18/7621* (2013.01); *C08G 18/7671* (2013.01); *C09D 175/04* (2013.01)

(58) Field of Classification Search
CPC .... C08G 18/4063; C08G 18/42; C08G 18/44; C08G 18/6216; C08G 18/73; C08G 18/755; C08G 18/758; C08G 18/7621; C08G 18/7671; C09D 175/04
See application file for complete search history.

(56) References Cited

U.S. PATENT DOCUMENTS

| | | | | |
|---|---|---|---|---|
| 5,178,952 A | * | 1/1993 | Yamamoto | C08G 18/4216 428/425.8 |
| 6,492,482 B2 | | 12/2002 | Lomoelder et al. | |
| 2011/0061915 A1 | * | 3/2011 | Sekito | C08G 18/348 174/258 |
| 2012/0042694 A1 | * | 2/2012 | Brown | C03C 17/04 65/36 |

FOREIGN PATENT DOCUMENTS

| | | |
|---|---|---|
| EP | 2468830 A1 | 6/2012 |
| JP | 2002-348499 A | 12/2002 |
| JP | 2008-231149 A | 10/2008 |
| KR | 2002-0056029 A | 7/2002 |
| KR | 2002-0087547 A | 11/2002 |
| KR | 10-0828789 B1 | 5/2008 |
| KR | 10-2009-0055437 A | 6/2009 |
| KR | 10-2010-0006572 A | 1/2010 |
| KR | 10-2010-0053542 A | 5/2010 |
| KR | 10-2011-0059338 A | 6/2011 |
| KR | 10-2011-0119113 A | 11/2011 |
| KR | 10-1247132 B1 | 4/2013 |
| KR | 10-2014-0048694 A | 4/2014 |
| WO | 2012089575 A1 | 7/2012 |

* cited by examiner

*Primary Examiner* — Patrick D Niland
(74) *Attorney, Agent, or Firm* — McDermott Will & Emery LLP

(57) ABSTRACT

A coating composition for one-coat-one bake coating includes a resin, a pigment, a solvent, and a general additive. The resin is an acryl modified urethane resin manufactured by polymerizing polycarbonate diol, polyester diol, an acryl resin, and an isocyanate monomer. The coating composition using one-coat-one bake coating can provide soft texture, excellent chemical resistance, and adhesion.

7 Claims, No Drawings

COATING COMPOSITION HAVING SMOOTH TEXTURE FOR ONE-COAT-ONE BAKE COATING

CROSS-REFERENCE TO RELATED APPLICATION

This application claims under 35 U.S.C. § 119(a) the benefit of priority to Korean Patent Application No. 10-2014-0179397 filed on Dec. 12, 2014, the entire content of which is incorporated herein by reference.

TECHNICAL FIELD

The present disclosure relates to a coating composition for 1-coat-1 bake coating. More particularly, the present disclosure relates to an environmental-friendly benzene, toluene, and xylene (BTX)-free coating composition having a smooth texture for 1-coat-1 bake coating, which contains an acryl modified urethane resin as a substrate having both of natural characteristics of an urethane resin and excellent chemical resistance and natural characteristics of an acryl resin.

BACKGROUND

Recently, as the use of leather materials and the like has been increasing for a vehicle interior, physical properties and characteristics of a coating composition have been enhanced. In the vehicle interior, a soft feel coating having improved soft feel is mainly used for vehicle interior parts which a driver or a passenger may frequently contact. When the coating is applied, a coating film is formed by a 2-coat-1 bake coating. A primary coating is applied for adhesion and color, and then a secondary coating is applied to provide a smooth texture. Process cost and working hour increase by applying the coating and drying the primer coating, a color base coating composition and a top coat coating composition in order, and during this process, an amount of volatile organic compounds (VOCs) and hazardous air pollutants (HAPs) generated is increased compared to a 1-coat-1 baking oil acryl lacquer coating, which applies only the primary coating. Accordingly, an environment-friendly BTX-free 1-coat-1 bake coating, capable of improving both workability of the oil acryl lacquer coating composition and smooth surface of the coating, is needed.

For example, 1-coat-1 bake coating, which uses an oil acryl lacquer coating composition, has been applied. The 1-coat-1 bake coating has good physical properties, such as heat resistance, moisture resistance, adhesion and the like. However, the 1-coat-1 bake coating according to the related art has week scratch resistance, and does not provide smooth feeling when a driver of passenger contacts a coated film.

A high elastic coating composition applying a polyester polycarbonate mixture-based polyurethane resin has been used to improve scratch resistance of a coating film and protect the coated surface. The high elastic coating composition according to the related art provides aesthetic improvement and smooth and strengthen coated surface. However, since 2-coat-1 bake coating is applied, process cost, working hour, volatile organic compounds and hazardous air pollutants increase, compared to the oil acryl lacquer.

The above information disclosed in this Background section is only for enhancement of understanding of the background of the invention, and therefore, it may contain information that does not form the prior art that is already known in this country to a person of ordinary skill in the art.

SUMMARY OF THE DISCLOSURE

The present disclosure has been made in an effort to solve the above-described problems associated with prior art.

An aspect of the present inventive concept provides an environmental-friendly benzene, toluene, and xylene (BTX)-free coating composition, which contains an acryl modified urethane resin as a substrate having excellent texture, chemical resistance, chemical resistance, and adhesion, and is applicable to a 1-coat-1 bake coating.

According to an exemplary embodiment of the present inventive concept, a coating composition for 1-coat-1 bake coating includes a resin, a pigment, a solvent, and a general additive. The resin is an acryl modified urethane resin manufactured by polymerizing polycarbonate diol, polyester diol, an acryl resin and an isocyanate monomer.

The composition may comprise the acryl modified urethane resin 30 to 70 wt %, the pigment 5 to 30 wt %, the solvent 20 to 50 wt %, and the general additive 0.1 to 10 wt %.

The acryl modified urethane resin may be manufactured by polymerizing a resin consisting of polycarbonate diol 30 to 60 wt %, polyester diol 20 to 40 wt % and an acryl resin 10 to 30 wt % and the isocyanate monomer to make molar ratio of [NCO]/[OH] 1 to 1.2.

The acryl modified urethane resin may have weight average molecular weight of 30,000 to 50,000, hydroxyl group content of 0 to 2%, and solid content of 40 to 60 wt %.

The polycarbonate diol may have weight average molecular weight of 500 to 5,000 and hydroxyl group content of 0.7 to 7%.

The polyester diol may have weight average molecular weight of 500 to 5,000 and hydroxyl group content of 0.7 to 7%.

The acryl resin may have weight average molecular weight of 20,000 to 40,000 and hydroxyl group content of 0.5 to 3.0%.

The isocyanate monomer may be at least one selected from the group consisting of toluene diisocyanate, 4,4-diphenylmethane diisocyanate, hexamethylene diisocyanate, isophorone diisocyanate and dicyclohexylmethane diisocyanate.

The general additive may be at least one selected from the group consisting of a UV stabilizing agent, a slip agent, a catalyst and a silver adhesion promoter.

Other aspects and exemplary embodiments of the inventive concept are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

DETAILED DESCRIPTION

Hereinafter reference will now be made in detail to various embodiments of the present inventive concept, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents, and other embodiments, which may be included within the spirit and scope of the invention as defined by the appended claims.

The present disclosure relates to a coating composition for a 1 coat 1 bake coating comprising a resin, a pigment, a solvent and a general additive. The coating composition of the present disclosure comprises an acryl modified urethane resin as a main ingredient. The acryl modified urethane resin is a polymer material consisting of a urethane resin (polyurethane) having soft texture and excellent chemical resistance and an acryl resin (polyacrylic) having good chemical resistance and adhesion properties.

Specifically, the coating composition of the present disclosure comprises the acryl modified urethane resin 30 to 70 wt %, the pigment 5 to 30 wt %, the solvent 20 to 50 wt % and the general additive 0.1 to 10 wt %.

Each ingredient of the coating composition according to the present disclosure will be described in detail as follows.

(1) Acryl Modified Urethane Resin

The acryl modified urethane resin comprises a urethane resin (polyurethane) and an acryl resin (polyacrylic), and has a weight average molecular weight of 30,000 to 50,000, a hydroxyl group content of 0 to 2 mol %, and a solid content of 40 to 60 wt %.

The acryl modified urethane resin can be manufactured by polymerizing polycarbonate diol, polyester diol, an acryl resin, and an isocyanate monomer. In other words, the acryl modified urethane resin can be manufactured by polymerizing the resin consisting of polycarbonate diol 30 to 60 wt %, polyester diol 20 to 40 wt %, and the acryl resin 10 to 30 wt % based on a total weight of the acryl modified urethane resin and an amount of the isocyanate monomer so as to provide a [NCO]/[OH] molar ratio of 1 to 1.2. A solvent for the polymerization reaction may be at least one selected from the group consisting of ketone-based, ester-based, and hydrocarbon-based. The content of the solvent used in this polymerization reaction may vary depending on coating film thickness and coating film forming method. The content of the solvent may be 10 to 40 wt %, based on a solid content of raw materials used.

The content of the acryl modified urethane resin contained in the coating composition of the present disclosure may be in a range of 30 to 70 wt % based on the solid content. When the content of the acryl modified urethane resin contained in the coating composition is less than 30 wt %, physical properties of the coating film such as acetone resistance, sun cream resistance, and the like may decrease, and when the content is over 70 wt %, storage stability may be deteriorated and workability during coating may be reduced.

The acryl modified urethane resin contained in the coating composition of the present disclosure may be previously manufactured by a polymerization reaction of polycarbonate diol, polyester diol, the acryl resin, and the isocyanate monomer.

As the polycarbonate diol used for manufacturing the acryl modified urethane resin, the polycarbonate diol having a weight average molecular weight of 500 to 5,000, a hydroxyl group content of 0.7 to 7 mol %, and a solid content of 100% may be used. The polycarbonate diol may be manufactured by a general polymerization method before use. The polycarbonate diol compound is manufactured by a condensation reaction of an alcohol compound and a carbonate compound. That is, the polycarbonate diol may be manufactured by the condensation reaction of the alcohol compound such as hexane diol, cyclohexane dimethane, and the like and the carbonate compound containing diethylcarbonate.

The polyester diol having the weight average molecular weight of 500 to 5,000, the hydroxyl group content of 0.7 to 7%, and the solid content of 100 wt % may be used in as the polyester diol used for manufacturing the acryl modified urethane resin. The polyester diol may be manufactured previously by a general polymerization method. The polyester diol compound may be manufactured by condensation reaction of an alcohol, such as methylpropane diol, diethyleneglycol, and the like and an acid, such as adipic acid, isophthalic acid, and the like.

The acryl resin having an average molecular weight of 20,000 to 40,000, a hydroxyl group content of 0.5 to 3.0 mol %, and a solid content of 40 to 60 wt % may be used as the acryl resin for manufacturing the acryl modified urethane resin to improve coating workability and productivity. The acryl resin may be manufactured by radical polymerization of various kinds of monomers, which have a vinyl type double bond, such as acryl-based monomer or metacryl-based monomer, using a pyrolysis initiator in a solution. The polymerization method of the acryl resin will be described in detail as follows.

A solvent such as an acetate, a ketone, and the like is put into a four-neck flask installed with an agitator, a cooler, and a thermometer. Then, monomers, such as an acryl-based monomer and methacryl-based monomer, and an initiator are dropped into the solvent at a temperature of 100 to 130° C. for 2 to 5 hours while maintaining temperature of the reactor at 100 to 130° C. After the dropping is completed, the resulting solution is kept for 0.5 to 1 hour, and then an additional initiator diluted in the solvent is dropped for 0.5 to 1 hour. After dropping the additional initiator, the resulting solution is kept at the same temperature for 2 to 3 hours, and then cold-packed, thereby manufacturing the acryl resin having the weight average molecular weight of 20,000 to 40,000, the hydroxyl group content of 0.5 to 3.0%, and the solid content of 50 wt %.

As the isocyanate monomer, a multi-functional isocyanate compound having at least two average functional groups may be used, for example, at least one selected from the group consisting of toluene diisocyanate, 4,4-diphenylmethane diisocyanate, hexamethylene diisocyanate, isophorone diisocyanate, dicyclohexylmethane diisocyanate and a multi-functional isocyanate derived thereof may be used, for at least one selected from the group consisting of isophorone diisocyanate and dicyclohexylmethane diisocyanate may be used. In order to polymerize the acryl modified urethane resin, the isocyanate monomer may be used in an amount of a 3 to 10 wt % range. If the amount of the isocyanate monomer used is less than 3 wt %, compatibility of the manufactured acryl modified urethane resin may decrease because the urethane bonding number is low while having unreacted hydroxyl groups. If the amount of the isocyanate monomer used is more than 10 wt %, viscosity may increase or gelling may occur. Thus, the isocyanate monomer is used within the amount of 3 to 10 wt %.

(2) Pigment

In the present disclosure, the pigment is used to provide color to the coating composition or to reduce gloss as a matt coating composition. The pigment may be an organic or inorganic-based colored pigment or extender pigment. The colored pigment may be at least one selected from the group consisting of carbon black, iron oxide, titanium dioxide, and phthalocyanine. The extender pigment may be at least one selected from the group consisting of micronized silica dispersion and barium sulfate. The pigment may be contained in the coating composition of the present disclosure in an amount of a 5 to 30 wt % range.

(3) Solvent

In the present disclosure, the solvent facilitates coating. Further, smoothness of a coating film may be maintained by controlling volatilization of the solvent. The solvent may be at least one selected from the group consisting of ester-based, aromatic hydrocarbon-based, ketone-based, and the like, or the solvent may be ketone-based solvent such as methyl ethyl ketone.

A content of the solvent may vary depending on the required coating film thickness and a coating film forming method, and the solvent may be contained in the coating composition of the present disclosure in an amount of a 20 to 50 wt % range.

(4) General Additive

A UV stabilizing agent, a slip agent, a catalyst, a silver adhesion promoter, and the like may be used in the coating composition of the present disclosure as the general additive. The additive used herein may be selectively contained as necessary. This general additive may be contained in the coating composition of the present disclosure in an amount of a 0.1 to 10 wt % range.

The general additive contained in the coating composition of the present disclosure will be described in detail as follows.

The UV stabilizing agent, which is a UV absorbing agent or a radical scavenger, improves weather resistance of a coating film. As the UV stabilizing agent, Tinuvin-based agent may be used. That is, the UV stabilizing agent may be a Tinuvin 1130 as a UV absorbing agent (UNA) or hindered amine (HALS)-based Tinuvin 292 as a radical scavenger and the like. The UV stabilizing agent may be contained in the coating composition of the present disclosure in an amount of a 0.3 to 3 wt %. If the content of the UV stabilizing agent is less than 0.3 wt %, its effect may be meager, and if it is added excessively, over 3 wt %, storage of the coating composition may be unstable and cost of raw materials may increase.

The slip agent softens a surface of a coating film and secures wear resistance. The slip agent may be any one commonly used in the art, such as a silicone-based slip agent. The slip agent may be contained in a transparent coating composition of the present disclosure in an amount of a 0.3 to 2 wt %. If the content of the slip agent is less than 0.3 wt %, physical properties, such as wear resistance, scratch resistance, and the like, may decrease, and if the content of the slip agent is over 2 wt %, adhesion property may be deteriorated when re-coating.

The catalyst is a urethane reaction catalyst and used for enhancing reaction rate of the main resin and the isocyanate. The reaction catalyst may be dibutyl tin dilaurate, representatively, and may be contained in the transparent coating composition in an amount of a 0.1 to 2 wt %. If the content of the reaction catalyst is less than 0.1 wt %, a catalyst effect cannot be achieved. I If the content of the reaction catalyst is over 2 wt %, the reaction rate may be too fast, thus decreasing pot life and workability.

The silver adhesion promoter improves adhesion force of a silver flake in a metal-type coating composition. This silver adhesion promoter may be contained in the coating composition of the present disclosure in an amount of a 0.2 to 1 wt %. When the content of the silver adhesion promoter is less than 0.2 wt %, the silver may be detached, and if it is contained excessively, over 1 wt %, the silver may be oxidized.

The coating composition of the present disclosure as described above may be coated after adjusting its viscosity to about 13.0 to 15.0 sec (Ford Cup #4) by controlling the content of a dilution solvent.

EXAMPLES

The following examples illustrate the invention and are not intended to limit the same.

Example

Preparation Example 1 and Comparative Preparation Example 1 to 5. Manufacture of Acryl Modified Urethane Resin A solvent such as N-methylpyrrolidone glycol ether ester and the like and polycarbonate diol (Mw 2,000, hydroxyl group content 1.7 mol %, solid content 100 wt %), polyester diol (Mw 2,000, hydroxyl group content 1.7 mol %, solid content 100 wt %) and an acryl resin (Mw 35,000, hydroxyl group content 1 mol %, solid content 50 wt %) were put into a reaction vessel installed with a reflux condenser, a nitrogen gas inlet pipe, a thermometer, an agitator and the like, heated to 60° C., and then stirred for sufficient dilution for 1 hour. Then, isophorone diisocyanate and dicyclohexylmethane diisocyanate were slowly added thereto, and heated to 80° C. While maintaining the reaction temperature, a metal catalyst such as dibutyl tin laurate was added every 1 to 2 hours for accelerating the reaction. Polymerization reaction was conducted for 5 to 6 hours, and NCO % of the resulting solution was measured, and then the reaction was stopped when the measured NCO % is below 0.1%. After completing the reaction, the resulting solution was diluted with a solvent such as a ketone or an acetate, and then cooled, filtered, and packed.

The acryl modified urethane resin manufactured by the polymerization has a weight average molecular weight of 40,000, a hydroxyl group content of 0.7 mol %, and a solid content of 50 mol %.

The method of Preparation Example was repeated to manufacture various acryl modified urethane resins except for changing composition ratio of the polycarbonate diol, the polyester diol, and the acryl resin used as raw materials, as shown in the following Table 1.

TABLE 1

| Section | Raw material of Resin (wt %) | | | Acryl modified urethane resin | | |
|---|---|---|---|---|---|---|
| | Poly-carbonate diol | Poly-ester diol | Acryl resin | Weight average molecular weight | Hydroxyl group content (mol %) | Solid content (wt %) |
| Comparative Preparation Example 1 | 55 | 45 | — | 31,000 | 0.7 | 50 |
| Comparative Preparation Example 2 | 50 | 41 | 9 | 35,000 | 0.7 | 50 |
| Comparative Preparation Example 3 | 44 | 36 | 20 | 35,000 | 0.7 | 50 |
| Comparative | 39 | 32 | 29 | 37,000 | 0.7 | 50 |

TABLE 1-continued

| Section | Raw material of Resin (wt %) | | | Acryl modified urethane resin | | |
|---|---|---|---|---|---|---|
| | Poly-carbonate diol | Poly-ester diol | Acryl resin | Weight average molecular weight | Hydroxyl group content (mol %) | Solid content (wt %) |
| Preparation Example 4 Comparative Preparation Example 5 | 64 | 14 | 20 | 38,000 | 0.7 | 50 |
| Preparation Example 1 | 48 | 32 | 20 | 40,000 | 0.7 | 50 |

Example 1 and Comparative Examples 1 to 5.
Manufacture of Coating Composition

The acryl modified urethane resin manufactured above, a pigment, a solvent, and general additives (a UV stabilizing agent, a slip agent, a catalyst, a silver adhesion promoter, and the like) were mixed to manufacture a coating composition. Specific ingredients used were as follows.

[Used Ingredients]

Acryl modified urethane resin: the acryl modified urethane resins, which were manufactured in Preparation Example 1 and Comparative Preparation Examples 1 to 5, respectively, were used.

Pigment: carbon black, phthalocyanine, micronized silica dispersion

Solvent: methylethylketone

UVstabilizing agent: 2:1 mixture of Tinuvin 1130 and Tinuvin 292

Slip agent: BYK-310 of BYK-Chemie, polydimethylsiloxane-type

Catalyst: dibutyl tin dilaurate

Silver adhesion promoter: phosphoric acid-type

TABLE 2

| | | Comparative Example | | | | |
|---|---|---|---|---|---|---|
| | Example 1 | 1 | 2 | 3 | 4 | 5 |
| Section Resin | Prep. Exam. 1, 50 | Comp. Prep. Exam. 1, 50 | Comp. Prep. Exam. 2, 50 | Comp. Prep. Exam. 3, 50 | Comp. Prep. Exam. 4, 50 | Comp. Prep. Exam. 5, 50 |
| Pigment | 8.0 | 8.0 | 8.0 | 8.0 | 8.0 | 8.0 |
| Solvent | 40.0 | 40.0 | 40.0 | 40.0 | 40.0 | 40.0 |
| UVstabilizing agent | 0.5 | 0.5 | 0.5 | 0.5 | 0.5 | 0.5 |
| Slip agent | 1.0 | 1.0 | 1.0 | 1.0 | 1.0 | 1.0 |
| Catalyst | 0.2 | 0.2 | 0.2 | 0.2 | 0.2 | 0.2 |
| Silver adhesion promoter | 0.3 | 0.3 | 0.3 | 0.3 | 0.3 | 0.3 |
| Total (wt %) | 100 | 100 | 100 | 100 | 100 | 100 |

Test Example 1. Measurement of Physical Properties of Coating

In order to measure physical properties of the coating compositions manufactured in Example 1 and Comparative Examples 1 to 5, the compositions were coated and hardened by the following method to manufacture samples.

A surface of a substrate made from acrylonitrile butadiene styrene (ABS) material or polycarbonate (PC)-ABS material was treated with isopropyl alcohol, the coating compositions manufactured in Example 1 and Comparative Examples 1 to 5 were coated thereon at a condition of coating viscosity of 15 sec (Ford Cup #4) (thickness: 20 to 30 μm), and then hardening at 80° C. for 30 min to manufacture a sample coating film. Physical properties of the coating films manufactured by the above method were measured by the following test method, and the results were shown in the following Table 2.

[Test Method]

1) Adhesion: according to ISO 2409 or JIS K 5600-5-6, a tape peel-off test was conducted. 100 squares (size: 2 mm×2 mm) were made by drawing perforated line on the coated side with a cutter, a adhesive cellophane tape (JIS Z1522) was firmly attached on the surface, the tape was peeled off by strongly pulling the tape with 90 degree angle, and then the coating film number remained in the square and peeling shape were evaluated.

2) Texture: After 5 or more people touched a real coated film surface with hands, the feel was evaluated by the following Table 3, and level was determined by the feel felt by the majority of people.

TABLE 3

| Level | Rubber feeling | Slip feeling |
|---|---|---|
| 5 | Surely elastic feeling like rubber | No hard feeling. Surely soft and smooth feeling |
| 4 | Moderately Elastic feeling | Moderately soft and smooth feeling |
| 3 | Little elastic feeling but not sure | Soft and smooth feeling but not sure |
| 2 | Little hard feeling | Little hard feeling |
| 1 | No rubber feeling. Hard feeling | No soft feeling. Hard feeling |

3) Scratch resistance: According to JIS K 6718, a surface of a test specimen manufactured at the same condition with the test specimen was scratched 100 mm at 4.9 N load, 100 mm/s rate, and then the surface condition was observed and evaluated according to the following Table 4.

TABLE 4

| Level | Appearance |
|---|---|
| 5 | No surface damage is recognized |
| 4 | Little surface damage is recognized |
| 3 | Surface damage is recognized but not severe |
| 2 | Surface damage is recognized |
| 1 | Surface damage is significantly recognized |

4) Sun cream resistance: Two sheets of white cotton cloth of the same size were piled up on an acryl plate (50×50 mm), Nivea SPF47 Sun cream 0.25 g was entirely coated thereon, the coated plate was put on the test specimen, and then the acryl plate was pressed for adhesion. The plate was stored in a 80±2° C. thermostatic bath for 1 hour followed by at room temperature for 10 min, washed with a neutral detergent and then dried. According to ISO 2409 or JIS 5600-5-6, the tape peel-off test was conducted.

5) Acetone resistance: a 4.9 N load weight (diameter: 4 cm) was wrapped with a gauze and fully moistened with acetone. The surface of the coating film was reciprocally rubbed with the weight 10 times, and then appearance was evaluated with naked eyes. Then, it was stored at room temperature for 1 hour followed by in a 80±2° C. thermostatic chamber for 3 hours and then picked out. The surface condition of the coating film was evaluated.

TABLE 5

| Section | Initial Adhesion | Surface soft feel | Scratch resistance | Sun cream resistance | Acetone resistance |
|---|---|---|---|---|---|
| Example 1 | 100/100 | 4 | 4 | Good | Good |
| Comparative Example 1 | 100/100 | 5 | 5 | NG | NG |
| Comparative Example 2 | 100/100 | 5 | 4 | NG | NG |
| Comparative Example 3 | 100/100 | 4 | 4 | Good | NG |
| Comparative Example 4 | 100/100 | 2 | 4 | Good | Good |
| Comparative Example 5 | 100/100 | 3 | 4 | Good | Good |

As the result of Table 5, it was confirmed that the coating composition comprising the acryl modified urethane resin as a main ingredient, which is manufactured by using proper polycarbonate diol, polyester diol, and an acryl resin with a set composition ratio and polymerizing thereof with isocyanate according to the present disclosure, can produce a coating film having excellent adhesion on the ABS or PC-ABS based substrate, scratch resistance, sun cream resistance, acetone resistance, smooth surface.

On the contrary, Comparative Example 1 is the case manufacturing a coating composition, which does not contain an acryl resin, by using a polyurethane resin as a main ingredient, which is manufactured by polymerization of polycarbonate diol and polyester diol with an isocyanate monomer. Here, it was confirmed that the coating film has relatively good scratch resistance and soft surface, but low chemical resistance (sun cream resistance, acetone resistance).

Comparative Example 2 is the case manufacturing a coating composition by using an acryl modified urethane resin as a main ingredient, which is manufactured by containing a small amount of an acryl resin, and it was confirmed that the coating film also had relatively good scratch resistance and smooth surface, but low chemical resistance (sun cream resistance, acetone resistance), like Comparative Example 1.

Comparative Examples 3 and 4 are the case of manufacturing a coating composition by using an acryl modified urethane resin as a main ingredient, which is manufactured by containing an excessive amount of an acryl resin, and it was confirmed that the coating film had good chemical resistance (sun cream resistance, acetone resistance), but much reduced smooth surface.

According to Comparative Examples 3 and 5, it can be confirmed that as the content of the polycarbonate diol in the acryl modified urethane resin increases, the smooth surface is reduced, but acetone resistance is improved.

In the present disclosure, a coating composition applied with 1-coat-1 bake coating has an economical effect by reduction of initial facility investment, holding cost, working hours, and the like.

Further, the coating composition according to the present disclosure has an environment-friendly effect of reducing exhaustion of volatile organic compounds and hazardous air pollutants by simplification of a coating process.

In addition, the coating composition according to the present disclosure has an effect of improving marketability due to improvement of physical properties such as chemical resistance, adhesion for materials, and the like together improvement of smooth surface.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A coating composition for one-coat-one bake coating, the coating composition comprising: a resin; a pigment; a solvent; and a general additive,
   wherein the resin is an acryl modified urethane resin manufactured by polymerizing polycarbonate diol, polyester diol, an acryl resin, and an isocyanate monomer,
   wherein the acryl modified urethane resin is manufactured by polymerizing, a resin, which contains 30 to 60 wt % of polycarbonate diol, 20 to 40% of polyester diol, and 10 to 30 wt % of an acryl resin based on a total weight of the acryl modified urethane resin, and an amount of the isocyanate monomer to provide a molar ratio of [NCO]/[OH] 1 to 1.2
   wherein the acryl resin has a weight average molecular weight of 20,000 to 40,000 and a hydroxyl group content of 0.5 to 3.0%.

2. The coating composition of claim 1, wherein the coating composition contains 30 to 70 wt % of the acryl modified urethane resin, 5 to 30 wt % of the pigment, 20 to 50 wt % of the solvent, and 0.1 to 10 wt % of the general additive based on a total weight of the coating composition.

3. The coating composition of claim 1, wherein the acryl modified urethane resin has a weight average molecular weight of 30,000 to 50,000 and a hydroxyl group content of 0 to 2 mol %.

4. The coating composition of claim 1, wherein the polycarbonate diol has a weight average molecular weight of 500 to 5,000 and a hydroxyl group content of 0.7 to 7%.

5. The coating composition of claim 1, the polyester diol has a weight average molecular weight of 500 to 5,000 and a hydroxyl group content of 0.7 to 7%.

6. The coating composition of claim 1, wherein the isocyanate monomer is at least one selected from the group consisting of toluene diisocyanate, 4,4-diphenylmethane diisocyanate, hexamethylene diisocyanate, isophorone diisocyanate, and dicyclohexylmethane diisocyanate.

7. The composition of claim 1, wherein the general additive is at least one selected from the group consisting of a UV stabilizing agent, a slip agent, a catalyst, and a silver adhesion promoter.

* * * * *